March 2, 1965  G. C. FAY  3,171,370
REFRACTORY SPRUNG ARCH

Filed Aug. 9, 1963  2 Sheets-Sheet 1

INVENTOR
GORDON C. FAY
BY
ATTORNEYS

March 2, 1965  G. C. FAY  3,171,370
REFRACTORY SPRUNG ARCH
Filed Aug. 9, 1963  2 Sheets-Sheet 2
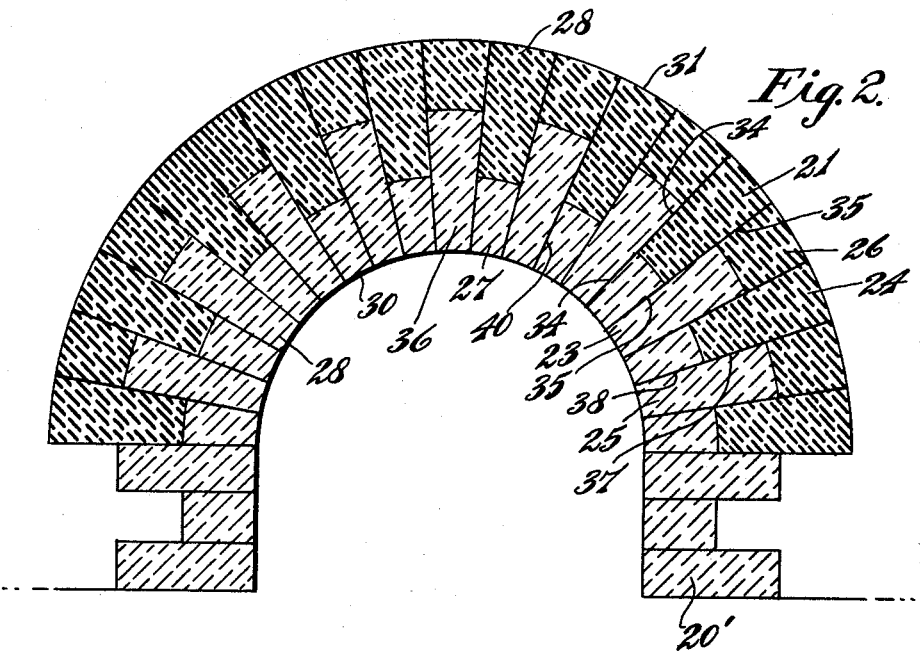
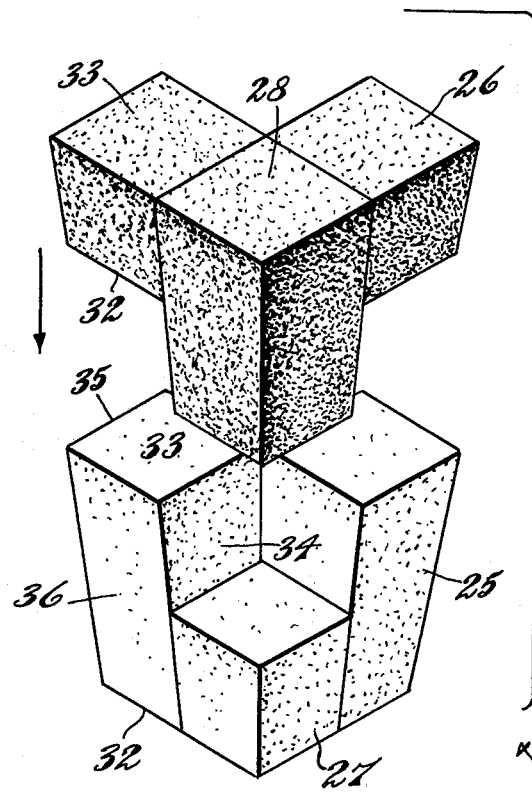
INVENTOR
GORDON C. FAY
BY
ATTORNEYS

United States Patent Office 3,171,370
Patented Mar. 2, 1965

3,171,370
REFRACTORY SPRUNG ARCH
Gordon C. Fay, Wynnewood, Pa., assignor to General Refractories Company, a corporation of Pennsylvania
Filed Aug. 9, 1963, Ser. No. 301,011
9 Claims. (Cl. 110—99)

The present invention relates to refractory sprung arches.

A purpose of the invention is to produce a sprung arch which is of longer service life and more resistant against destruction by conditions encountered, especially more resistant against crushing, breaking or spalling.

A further purpose is to provide a sprung arch for use in a furnace or the like comprising an inner layer of refractory bricks and an outer layer of refractory bricks, the arch being curved and the refractory bricks themselves converging toward the interior, there being one short refractory brick of one layer paired with one long refractory brick of the other layer and vice versa, and two adjoining long refractory bricks of the outer layer serving to hold one long refractory brick of the inner layer while in turn two long refractory bricks of the inner layer hold a short refractory brick of the inner layer.

A further purpose is to make the outer layer of refractory bricks which are relatively strong, rigid and structurally stable in the form of an arch or dome under the service conditions at elevated temperature, and to make the inner layer of refractory bricks which are more resistant to destructive forces at elevated temperature and to corrosion or erosion under the service conditions, even though they may be subject to softening and less rigid and less structurally stable.

A further purpose is to make the outer layer of refractory bricks of silica or semi-silica type and the inner layer of refractory bricks of sillimanite, mullite, high alumina, chrome-magnesia or magnesia-chrome.

A further purpose is to use for the inner layer bricks which could not remain in place except for the support of the outer layer.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 2 is a vertical section of a sprung arch of the invention applied for example to a burner arch on a tunnel kiln.

FIGURE 3 is an exploded perspective showing the construction of a sprung arch according to the invention.

Figure 1:
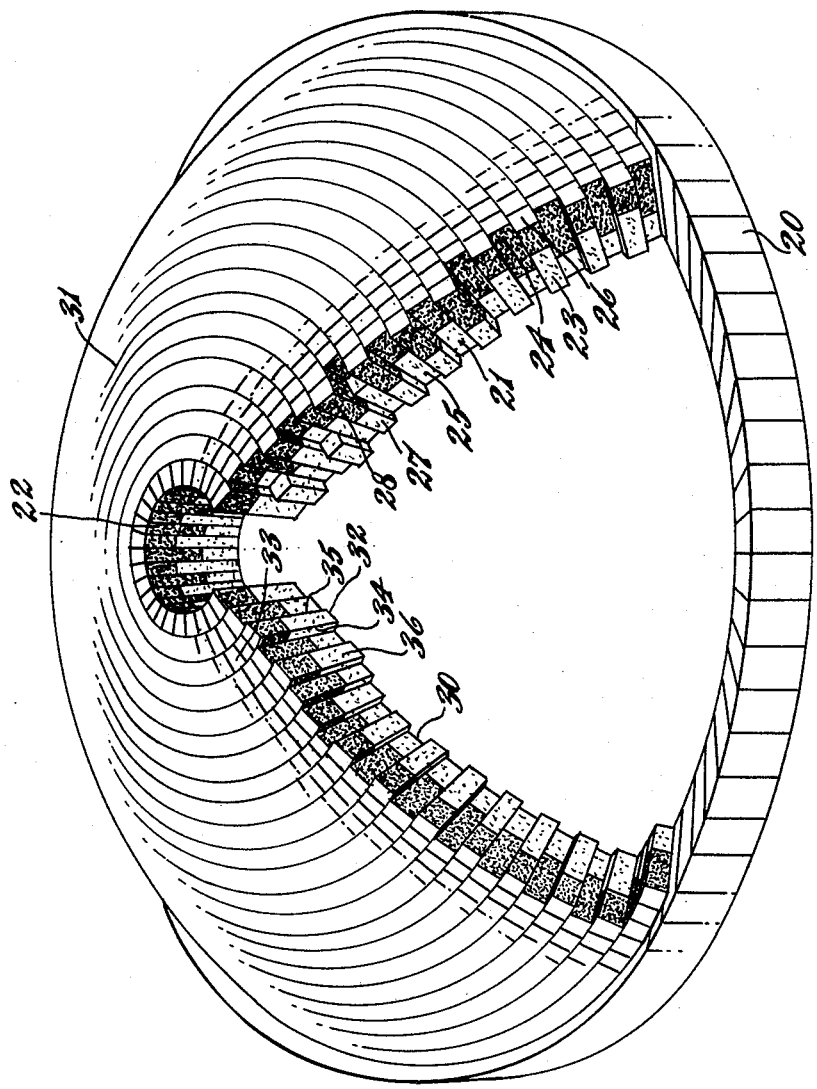
FIGURE 1 is a fragmentary perspective of a sprung arch of the invention applied to the dome of a furnace.

Serious problems arise in the construction of sprung arches for metallurgical furnaces and other furnaces such as tunnel kilns because the refractory brick which are most suitable for resisting elevated temperature, corrosion or erosion or other destructive conditions on the inside of the furnace are often not adequately strong at service temperature, or not sufficiently rigid, or not sufficiently structurally stable or any combination of these. Sometimes the interior of the furnace is subjected to severe thermal shock, and it may be that the refractory that would be most suited from the standpoint of structural strength at the service conditions would not be capable of withstanding such high thermal shock. In other cases the temperature on the interior is so high that the refractory which is preferably used to withstand it under the operating conditions is not capable of withstanding the crushing force in a usual prior art type of sprung arch.

In accordance with the present invention, a sprung curved arch is made with two brick layers, an inner layer and an outer layer. The outer layer is suitably of a refractory brick which has the most desirable structural characteristics under the particular service conditions, especially the elevated temperatures. It should be of a refractory brick which is strong and rigid under the conditions. It should also be structurally stable.

The inner layer is made of a refractory brick which is best suited to function under the prevailing conditions at the inside of the furnace, for example best able to withstand the inner temperature, or to resist the thermal shock of heating and cooling, or to function under the conditions of erosion or corrosion which prevail in the particular furnace or any combination of these.

The two brick layers are bonded together without the need to introduce any extraneous metallic components or to use any cement.

Each of the inner and the outer layers is made of alternately long and short bricks. In one pair, the short brick is in the outer layer and in the next pair the short brick is in the inner layer.

The lateral faces of the bricks converge inwardly. The arch curvature is such that the outer end of the longer bricks in the outer layer is larger and is thus held against moving inwardly. At the same time the outer end of the longer brick in the inner layer is larger and is held by the inner ends of the longer bricks of the outer layer. Finally the outer end of the shorter brick in the inner layer is held by the side engagement with the longer bricks of the inner layer.

FIGURE 1 shows a sprung arch according to the invention which in this case takes the form of a dome and suitably may be used as a furnace roof, for example in the dome of a blast furnace stove or an electric metallurgical furnace for melting and refining metals, suitably iron and steel.

This includes annular skewbacks 20 supporting a sprung arch 21 which extends inwardly and may have a port or opening 22 at a suitable point if desired.

The sprung arch 21 comprises an inner layer of refractory bricks 23 and an outer layer of refractory bricks 24 which are so assembled as to interlock the layers together in a manner to be described.

The bricks of the inner and outer layers cooperate in pairs and consist alternately of a long inner brick 25 which is paired with a short outer brick 26, or a short inner brick 27 which is paired with a long outer brick 28.

In any case the combined lengths of the inner and outer bricks of each pair are the same so that the interior surface 30 is suitably a smooth continuous surface and the exterior surface 31 is likewise a smooth continuous surface.

Each of the bricks regardless of whether it is an inner brick or an outer brick, as best seen in FIGURE 3, has a hot end 32 and a cold end 33 and it has inwardly converging lateral surfaces 34 and 35 so that on any pair of bricks there are straight radial side faces in prolongation along the pair of bricks.

The question of whether the other lateral surfaces 36 converge or not depends on whether the arch is cylindrical, in which case the lateral surfaces 36 may be parallel (FIGURE 2), or whether the arch is spherical or dome-shaped, in which case the other lateral surfaces 36 desirably also converge radially inwardly (FIGURE 1).

Thus it will be seen in FIGURE 2 that each of the longer bricks 28 of the outer layer protrudes inwardly on opposite sides of the shorter bricks 26 of the outer layer and forms inwardly converging surfaces 37. The surfaces 37 engage against inwardly converging faces 38 of the longer refractory brick 25 of the inner layer and lock it in place because its outer end is larger than the space through which it might move inwardly.

Similarly the inwardly converging lateral faces 38 of the longer refractory bricks 25 of the inner layer engage inwardly converging lateral faces 40 of the shorter refractory bricks 27 of the inner layer and hold them in place because the outer ends of the shorter refractory bricks 27 are larger.

FIGURE 2 shows a modification in which the sprung arch rests on a wall 20' and is suitably cylindrical. This type of construction is well suited for burner arches for example in tunnel kilns.

It will be evident that the present invention can be molded with a wide variety of different refractory brick compositions for the inner and the outer layers.

The combinations will be numerous depending on service conditions such as temperature, thermal shock, gas exposure, corrosion and erosion.

A very desirable embodiment for use in the present invention employs silica bricks for the outer layer. These are extremely strong and rigid and act as a good structural support for the sprung arch. Another suitable type of brick for the outer layer is semi-silica.

A very good refractory brick for the inner layer in many installations is sillimanite, which has the capability of resisting high temperature and is more resistant to thermal shock. Sillimanite, however, tends to soften at operating temperatures so that it would not be dependable structurally in many installations if the entire arch were constructed of sillimanite.

Other suitable bricks for the inner layer, which might not be suitable for a complete sprung arch under many working conditions, are mullite, high alumina, chrome-magnesite and magnesite-chrome.

In view of my invention and disclosure variations and modifications to meet individual whim or particular need will doubtless become evident to others skilled in the art, to obtain all or part of the benefits of my invention without copying the method shown, and I therefore claim all such insofar as they fall within the reasonable spirit and scope of my claims.

Having thus described my invention, what I claim as new and desire to secure by Letters Patent is:

1. A curved refractory sprung arch for a furnace or the like, comprising an inner layer of refractory bricks and an outer layer of refractory bricks, the refractory bricks in both the inner and the outer layers converging toward the radius, the refractory bricks of both layers being alternately long and short, there being a short refractory brick of one layer paired with a long refractory brick of the other layer and vice versa, adjoining long refractory bricks of the outer layer having adjoining surfaces which converge radially inwardly and which engage and hold opposed surfaces of a long refractory brick of the inner layer, and adjoining long refractory bricks of the inner layer having adjoining radially inwardly converging surfaces which engage opposed radially inwardly converging surfaces of a short refractory brick of the inner layer, the said inner and outer layers being of different compositions.

2. An arch of claim 1, in which the refractory bricks of the outer layer have relatively greater strength at the temperature of service than the refractory bricks of the inner layer.

3. An arch of claim 1, in which the refractory bricks of the outer layer are of silica.

4. An arch of claim 1, in which the refractory bricks of the outer layer are of semi-silica refractory.

5. An arch of claim 1, in which the refractory bricks of the inner layer are of sillimanite.

6. An arch of claim 1, in which the refractory bricks of the inner layer are of mullite.

7. An arch of claim 1, in which the refractory bricks of the inner layer are of high alumina refractory.

8. An arch of claim 1, in which the refractory bricks of the inner layer are of chrome-magnesite refractory.

9. An arch of claim 1, in which the refractory bricks of the inner layer are of magnesite-chrome refractory.

References Cited in the file of this patent

UNITED STATES PATENTS

| 345,046 | Gilman | July 6, 1886 |
|---|---|---|
| 1,416,716 | Jette | May 23, 1922 |
| 2,158,943 | Mamula | May 16, 1939 |
| 2,304,170 | Heuer | Dec. 8, 1942 |

FOREIGN PATENTS

| 477,131 | Great Britain | Dec. 22, 1937 |